US011883801B2

(12) United States Patent
Hiraiwa et al.

(10) Patent No.: US 11,883,801 B2
(45) Date of Patent: Jan. 30, 2024

(54) STEAM REFORMING CATALYST AND FUEL CELL SYSTEM USING THE SAME

(71) Applicant: Sumitomo Electric Industries, Ltd., Osaka (JP)

(72) Inventors: Chihiro Hiraiwa, Osaka (JP); Masatoshi Majima, Osaka (JP); Takahiro Higashino, Osaka (JP); Naho Mizuhara, Osaka (JP); Hiromasa Tawarayama, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 676 days.

(21) Appl. No.: 17/056,018

(22) PCT Filed: May 22, 2019

(86) PCT No.: PCT/JP2019/020239
§ 371 (c)(1),
(2) Date: Nov. 17, 2020

(87) PCT Pub. No.: WO2019/244546
PCT Pub. Date: Dec. 26, 2019

(65) Prior Publication Data
US 2021/0213430 A1 Jul. 15, 2021

(30) Foreign Application Priority Data
Jun. 20, 2018 (JP) .................................. 2018-116835

(51) Int. Cl.
*B01J 23/89* (2006.01)
*B01J 23/20* (2006.01)
(Continued)

(52) U.S. Cl.
CPC ............. *B01J 23/892* (2013.01); *B01J 23/20* (2013.01); *B01J 23/755* (2013.01); *B01J 23/89* (2013.01);
(Continued)

(58) Field of Classification Search
CPC ........ B01J 23/892; B01J 23/20; B01J 23/755; B01J 23/89; C01B 3/40; C01B 2203/0233;
(Continued)

(56) References Cited

U.S. PATENT DOCUMENTS

2011/0039183 A1 2/2011 Armstrong et al.
2011/0121238 A1 5/2011 Wakatsuki
(Continued)

FOREIGN PATENT DOCUMENTS

CA 3055588 A1 * 9/2018 ............. C25B 9/203
EP 1093852 A1 4/2001
(Continued)

OTHER PUBLICATIONS

English translation of Written Opinion for PCT/JP2019/020239. (Year: 2019).*

(Continued)

*Primary Examiner* — Patricia L. Hailey
(74) *Attorney, Agent, or Firm* — XSENSUS LLP

(57) ABSTRACT

A steam reforming catalyst that promotes production of hydrogen from a gas containing a hydrocarbon in the presence of steam includes a carrier and two or more catalyst metals supported on the carrier and including a first metal and a second metal. The first metal includes Ni, the second metal includes at least one of Co and Ru, and the carrier is represented by $LaNbO_4$ or $La_{1-x}Sr_xNbO_4$ where x is in a range of $0<x\leq 0.12$.

14 Claims, 2 Drawing Sheets

(51) Int. Cl.
*B01J 23/755* (2006.01)
*C01B 3/40* (2006.01)
*H01M 8/0612* (2016.01)

(52) U.S. Cl.
CPC .............. *C01B 3/40* (2013.01); *H01M 8/0618* (2013.01); *C01B 2203/0233* (2013.01); *C01B 2203/066* (2013.01); *C01B 2203/107* (2013.01); *C01B 2203/1058* (2013.01); *C01B 2203/1082* (2013.01); *C01B 2203/1247* (2013.01)

(58) Field of Classification Search
CPC ...... C01B 2203/066; C01B 2203/1058; C01B 2203/107; C01B 2203/1082; C01B 2203/1247; H01M 8/0618
USPC .................. 502/303, 326; 429/400, 423, 425
See application file for complete search history.

(56) References Cited

U.S. PATENT DOCUMENTS

| | | | |
|---|---|---|---|
| 2014/0051000 A1 | 2/2014 | Ogawa et al. | |
| 2017/0001187 A1 | 1/2017 | Koo et al. | |
| 2021/0162393 A1* | 6/2021 | Hiraiwa | ............... B01J 23/8474 |

FOREIGN PATENT DOCUMENTS

| | | | | | |
|---|---|---|---|---|---|
| JP | 2000-84410 A | | 3/2000 | | |
| JP | 2010-6650 A | | 1/2010 | | |
| JP | 2010-22983 A | | 2/2010 | | |
| JP | 2011-194340 A | | 10/2011 | | |
| JP | 2011-212598 A | | 10/2011 | | |
| JP | 2011194340 A | * | 10/2011 | ............ | B01J 23/847 |
| JP | 2011212598 A | * | 10/2011 | ............ | B01J 23/89 |
| JP | 2012-234664 A | | 11/2012 | | |
| JP | 2016-165712 A | | 9/2016 | | |
| JP | 2016165712 A | * | 9/2016 | ............ | B01J 23/63 |
| JP | 2017-13040 A | | 1/2017 | | |
| WO | WO-2006066918 A2 | * | 6/2006 | ............ | H01B 1/122 |

OTHER PUBLICATIONS

Truls Norby et al., "On the development of proton ceramic fuel cells based on Ca-doped LaNbO4 as electrolyte." Journal of Power Sources 282, pp. 28-33. (Year: 2015).*

Hilde Lea Lein et al., "Asymmetric proton conducting oxide membranes and fuel cells prepared by aqueous type casting." Solid State Ionics 179, pp. 1146-1150. (Year: 2008).*

Tommy Mokkelbost et al., "Thermal and mechanical properties of LaNbO4-based ceramics." Ceramics International 35, pp. 2877-2883. (Year: 2009).*

Office Action dated Aug. 2, 2022 in Japanese Patent Application No. 2020-525387, 10 pages.

Development of Matsumatsu, Kazuo, et al., "Steam-reforming catalysts, application to hydrogen-permeable reactors", Abstracts of Petroleum Society, Autumn Association, Japan, Public Interest Incorporated Agency, a forty third Petroleum and Petrochemical Society (Kitakyushu), Japan Institute of Petroleum science, vol. 01, Jan. 14, 2014, 1 page.

Juan Alvarez et al., "Ni—Nb-Based Mixed Oxides Precursors for the Dry Reforming of Methane", Topics in Catalysis, Kluwer Academic Publishers-Plenum Publishers, NE, vol. 54, No. 1-4, Jan. 21, 2011, pp. 170-178.

International Search Report and Written Opinion dated Jul. 16, 2019 for PCT/JP2019/020239 filed on May 22, 2019, 10 pages including English Translation of the International Search Report.

* cited by examiner

STEAM REFORMING CATALYST AND FUEL CELL SYSTEM USING THE SAME

CROSS-REFERENCE TO RELATED APPLICATIONS

The present application is based on PCT filing PCT/JP2019/020239, filed May 22, 2019, which claims priority to JP 2018-116835, filed Jun. 20, 2018, the entire contents of each are incorporated herein by reference.

TECHNICAL FIELD

The present disclosure relates to a steam reforming catalyst and a fuel cell system.

BACKGROUND ART

In general, hydrogen, which is a fuel supplied to an anode of a solid oxide fuel cell (SOFC), is produced by performing steam reforming of a hydrocarbon such as propane. Since a steam reforming reaction is an endothermic reaction, additional heating by an external heat source is necessary in order to maintain a reaction temperature at which high catalytic activity is exhibited. In view of this, autothermal steam reforming in which the steam reforming reaction is combined with a partial oxidation reaction, which is an exothermic reaction, has been studied.

Patent Literature 1 discloses an autothermal reforming catalyst formed of a zirconia carrier supporting ruthenium or an inorganic oxide carrier (for example, alumina) supporting ruthenium and zirconium.

Patent Literature 2 discloses a method for operating an oxidation autothermal reforming apparatus for producing a reformed gas that contains hydrogen as a main component by a reforming reaction using, as raw materials, a hydrocarbon or an aliphatic alcohol, steam, and an oxidizing gas, in which when an amount of reformed gas produced is increased, an operating condition is changed in the following order: first, the amount of the steam supplied is increased, subsequently, the amount the oxidizing gas supplied is increased, and finally, the amount of the hydrocarbon or the aliphatic alcohol supplied is increased.

CITATION LIST

Patent Literature

PTL 1: Japanese Unexamined Patent Application Publication No. 2000-84410
PTL 2: Japanese Unexamined Patent Application Publication No. 2010-6650

SUMMARY OF INVENTION

An aspect of the present disclosure relates to a steam reforming catalyst that promotes production of hydrogen from a gas containing a hydrocarbon in the presence of steam, the steam reforming catalyst including a carrier, and two or more catalyst metals supported on the carrier and including a first metal and a second metal, in which the first metal includes Ni, the second metal includes at least one of Co and Ru, and the carrier is represented by $LaNbO_4$ or $La_{1-x}Sr_xNbO_4$ where x is in a range of $0<x\leq0.12$.

Another aspect of the present disclosure relates to a fuel cell system including
a fuel cell that includes
a cell structure including a cathode, an anode, and a solid electrolyte layer disposed between the cathode and the anode,
a cathode-side separator disposed on a cathode side with respect to the solid electrolyte layer,
an anode-side separator disposed on an anode side with respect to the solid electrolyte layer,
an oxidant channel which is formed between the cathode-side separator and the cathode and through which an oxidant is supplied to the cathode, and
a fuel channel which is formed between the anode-side separator and the anode and through which a fuel is supplied to the anode; and
a steam reformer that includes the steam reforming catalyst.

DESCRIPTION OF EMBODIMENTS

Figure 1:
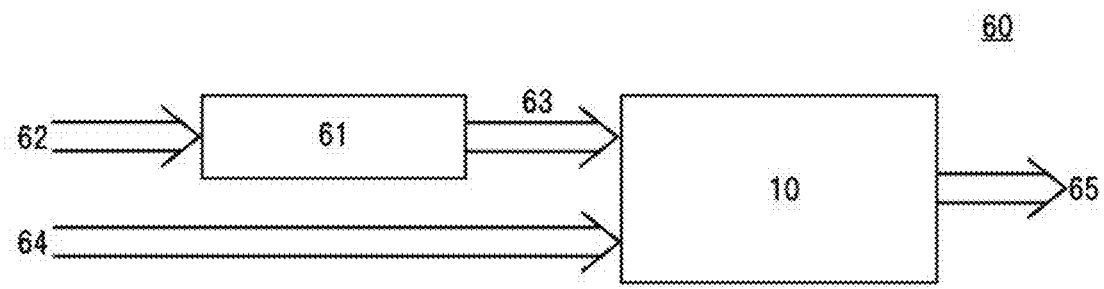
FIG. 1 is a schematic view illustrating the configuration of a fuel cell system according to an embodiment of the present disclosure.

Problems to be Solved by Present Disclosure

The steam reforming is performed at a high temperature of about 700° C. or higher. However, at a lower reaction temperature of steam reforming, the energy consumed by an external heat source can be reduced. Furthermore, the reaction temperature of a steam reformer that is used for supplying hydrogen used in a SOFC is preferably substantially the same as an operating temperature of the SOFC. Accordingly, in the case of combination with a SOFC that operates in an intermediate temperature range of 400° C. or higher and 600° C. or lower, the steam reforming reaction is preferably allowed to proceed at a temperature of 400° C. or higher and 600° C. or lower, which is the same as the operating temperature of the SOFC.

However, the reaction temperature of the steam reformer cannot be decreased because reactivity of a catalyst used in the steam reforming reaction is not sufficient at a temperature of lower than 700° C.

[Advantageous Effects of Present Disclosure]

According to the one aspect of the present disclosure, it is possible to provide a steam reforming catalyst having sufficient activity even at intermediate to low temperatures of lower than 700° C.

According to the other aspect of the present disclosure, it is possible to provide a fuel cell system that achieves high energy efficiency by using the above steam reforming catalyst.

DESCRIPTION OF EMBODIMENTS OF INVENTION

First, the contents of embodiments of the present disclosure will be listed and described.
(1) A steam reforming catalyst according to an embodiment of the present disclosure is a steam reforming catalyst that promotes production of hydrogen from a gas containing a hydrocarbon in the presence of steam, the steam reforming catalyst including:

a carrier; and two or more catalyst metals supported on the carrier and including a first metal and a second metal, in which the first metal includes Ni, the second metal includes at least one of Co and Ru. and the carrier is represented by $LaNbO_4$ or $La_{1-x}Sr_xNbO_4$ where x is in a range of $0<x\leq0.12$.

According to the above embodiment of the present disclosure, the catalyst in which catalyst metals including Ni as a first metal and Co and/or Ru as a second metal are supported on $LaNbO_4$ or $La_{1-x}Sr_xNbO_4$ ($0<x\leq0.12$) serving as a carrier has high catalytic activity in the steam reforming reaction even at intermediate to low temperatures of lower than 700° C. The use of this catalyst enables steam reforming to be performed at 600° C. or lower and can reduce the amount of energy consumption necessary to heat a steam reformer to higher than 600° C.

(2) The carrier is preferably formed of $La_{1-x}Sr_xNbO_4$ where x is in a range of $0.08\leq x\leq 0.12$. As a result of the steam reforming reaction, besides hydrogen gas, methane ($CH_4$), carbon dioxide ($CO_2$), carbon monoxide (CO), and carbon (C) can be produced as by-products. Of these, carbon may adhere to the surface of the reforming catalyst as soot and cause a decrease in the reaction efficiency. The amount of carbon that can be produced as a by-product of the steam reforming reaction can be reduced by using the carrier formed of $La_{1-x}Sr_xNbO_4$ where the amount x of Sr added is a value close to x=0.1 and the amount x of Sr added is in a range of $0.08\leq x\leq 0.12$. In addition, the amount of methane produced can also be reduced.

(3) The second metal preferably includes at least Co, in this case, a conversion rate from the hydrocarbon to hydrogen can be increased.

The catalyst metals may further include a third metal different from Ni and the second metal.

(4) A content of the catalyst metals is preferably 1% by mass or more and 5% by mass or less based on a whole mass of the catalyst metals and the carrier. A content of the second metal is preferably 0.15% by mass or more and 0.5% by mass or less based on a total mass of the catalyst metals and the carrier. In this case, a high conversion rate from the hydrocarbon can be obtained while the amount of carbon produced is maintained to be low.

More preferably, in the case where the carrier is formed of $La_{1-x}Sr_xNbO_4$ ($0.08\leq x\leq 0.12$) and the second metal includes Co, a high conversion rate can be obtained by setting the content of the second metal to 0.25% by mass or more and 0.35% by mass or less based on the total mass of the catalyst metals and the carrier.

(5) The carrier is preferably supported on a porous body. When the carrier is supported on surfaces of pores of the porous body, the area of surfaces where the hydrocarbon gas comes in contact with the catalyst metals can be increased to improve the reaction efficiency. Preferably, the carrier is supported on a porous body having a honeycomb structure.

(6) The hydrocarbon preferably includes propane. The steam reforming catalyst is particularly good in term of steam reforming of propane.

(7) The gas containing a hydrocarbon is preferably a mixed gas containing the hydrocarbon and oxygen. The steam reforming catalyst exhibits good catalytic activity under autothermal conditions.

(8). A fuel cell system according to an embodiment of the present disclosure includes a fuel cell that includes a cell structure including a cathode, an anode, and a solid electrolyte layer disposed between the cathode and the anode, a cathode-side separator disposed on a cathode side with respect to the solid electrolyte layer, an anode-side separator disposed on an anode side with respect to the solid electrolyte layer, an oxidant channel which is formed between the cathode-side separator and the cathode and through which an oxidant is supplied to the cathode, and a fuel channel which is formed between the anode-side separator and the anode and through which a fuel is supplied to the anode; and a steam reformer. The steam reformer includes the steam reforming catalyst described above. According to the fuel cell system, steam reforming can be performed at a relatively low temperature of 600° C. or lower. Thus, energy consumed by an external heat source can be reduced, and the fuel cell can be operated at high efficiency.

(9) Preferably, in (8), an operating temperature of the fuel cell and a reaction temperature of the steam reformer are each 400° C. or higher and 600° C. or lower. Since the temperature difference between the reaction temperature of steam reforming and the operating temperature of the SOFC can be reduced, heat loss can be reduced when a reformed gas is supplied to the fuel cell, and the energy efficiency of the fuel cell can be further increased.

DETAILS OF EMBODIMENTS OF INVENTION

Specific examples of the embodiments of the present invention will now be described with appropriate reference to the drawings. The present invention is not limited by these illustrative examples but is defined by the scope of the attached claims. It is intended to cover all modifications within the meaning and the scope of equivalents of the claims.

(Steam Reforming Catalyst)

A steam reforming catalyst is constituted by supporting two or more catalyst metals including a first metal and a second metal on $LaNhO_4$ or $La_{1-x}Sr_xNbO_4$ serving as a carrier. Here, x is in a range of $0<x\leq0.12$. The first metal includes, for example, Ni. The second metal includes, for example, at least one of Co and Ru. The $LaNbO_4$ or $La_{1-x}Sr_xNbO_4$ can be synthesized by a solid-phase method such as a solid-phase synthesis method. Specifically, in the case of using a solid-phase synthesis method, the synthesis can be performed by, for example, mixing $La_2O_3$, $Nb_2O_5$, and SrO and heat-treating the mixture. Alternatively, a liquid-phase method may be employed, and the synthesis may be performed by sintering.

The first metal and the second metal can be supported on the carrier by using, for example, an evaporation drying method. As a first metal source, a salt compound of the first metal, for example, nickel(II) nitrate hexahydrate ($Ni(NO_3)_2 \cdot 6H_2O$) can be used. Similarly, as a second metal source, a salt compound of the second metal, for example, cobalt(II) nitrate hexahydrate ($Co(NO_3)_2$; $6H_2O$) can be used as a Co source, or ruthenium(III) trinitrate ($Ru(NO_3)_3$) can be used as a Ru source.

In the evaporation drying method, a surface of a carrier is brought into contact with a solution in which the first metal source and the second metal source are dissolved, and the solvent is then removed by the evaporation drying method to support the compound of the first metal and the compound of the second metal on the carrier. For example, in the case where nitrates are used as the first metal source and the second metal source, nickel nitrate and cobalt nitrate (or ruthenium nitrate) are supported on the carrier. Subsequently, nitric acid is removed by heat treatment (for example, at 600° C.) in a reducing atmosphere, and the first metal and the second metal are supported on the carrier.

The amounts of the first metal and the second metal supported on the carrier can be evaluated by inductively coupled plasma (ICP) emission spectroscopy.

(Steam Reformer)

A steam reformer includes a reforming unit (not illustrated) provided with a steam reforming catalyst and a heating unit (not illustrated) configured to heat the reforming unit. Preferably, the reforming unit includes a porous body, and the steam reforming catalyst is supported on surfaces of pores of the porous body. Examples of the porous body (porous material) include aluminum oxide (alumina), zirconium oxide (zirconia), and cordierite ($2MgO \cdot 2Al_2O_3 \cdot 5SiO_2$). The porous body is preferably one having a honeycomb structure. Such a porous body having a honeycomb structure is produced by, for example, kneading a powder of a porous material (optionally with a binder), and forming the kneaded product into a predetermined shape by, for example, extrusion molding.

When a gas containing a hydrocarbon and steam is supplied to the steam reformer, the steam reforming catalyst supported on the porous body promotes the steam reforming reaction of the hydrocarbon to produce hydrogen gas from the gas containing the hydrocarbon and steam. As a result, a reformed gas containing hydrogen gas and containing by-products of the steam reforming reaction, such as methane, carbon dioxide, and carbon monoxide is obtained. The reformed gas containing hydrogen gas is supplied to a fuel cell described later. Preferably, the hydrogen gas is separated from the reformed gas by using, for example, a hydrogen permeable film, and the hydrogen gas after separation can be supplied to the fuel cell.

Regarding the structure of the steam reformer, for example, a cylindrical steam reformer can be used. Such a cylindrical steam reformer has two treatment chambers in an inner cylindrical section and an outer cylindrical section located on the outer peripheral side of an inner cylindrical section. The inner cylindrical section and the outer cylindrical section are partitioned by a porous body. A gas containing a hydrocarbon and steam is supplied to one of the inner cylindrical section and the outer cylindrical section. The gas containing the hydrocarbon and steam passes through pores of the porous body and flows into the other one of the inner cylindrical section and the outer cylindrical section. At this time, the hydrocarbon is subjected to steam reforming by the action of a steam reforming catalyst supported on the porous body, and a reformed gas can be taken from the other one of the inner cylindrical section and the outer cylindrical section.

(Fuel Cell System)

FIG. 1 schematically illustrates the configuration of a fuel cell system according to an embodiment of the present disclosure. A fuel cell system 60 includes at least a steam reformer 61 and a fuel cell 10. As the steam reformer 61, the steam reformer described above is used. A gas 62 containing a hydrocarbon and steam is supplied to the steam reformer 61, and hydrogen gas is produced. A reformed gas (fuel gas) 63 containing this hydrogen gas is supplied to the fuel cell 10. In addition, air (oxidant) 64 is also supplied to the fuel cell 10. An exhaust gas 65 is discharged from the fuel cell 10.

(Fuel Cell)

Figure 2:
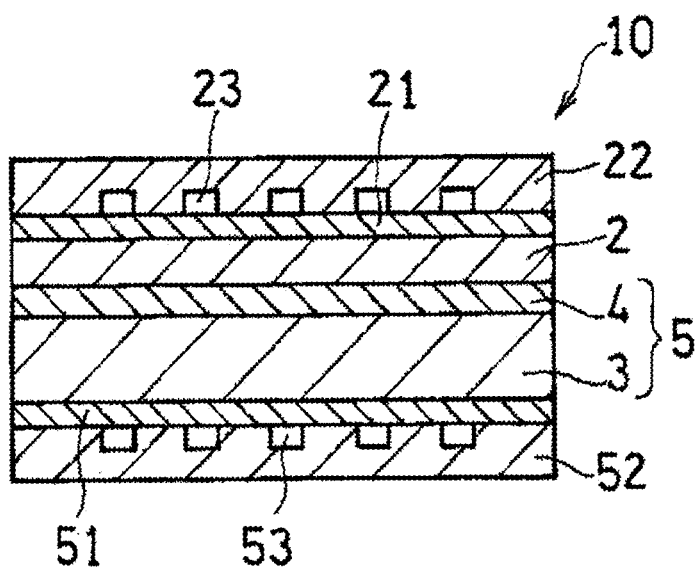
FIG. 2 is a schematic sectional view illustrating a fuel cell used in a fuel cell system according to an embodiment of the present disclosure.

FIG. 2 is a schematic sectional view illustrating a fuel cell (solid oxide fuel cell) used in combination with a steam reformer.

Figure 3:
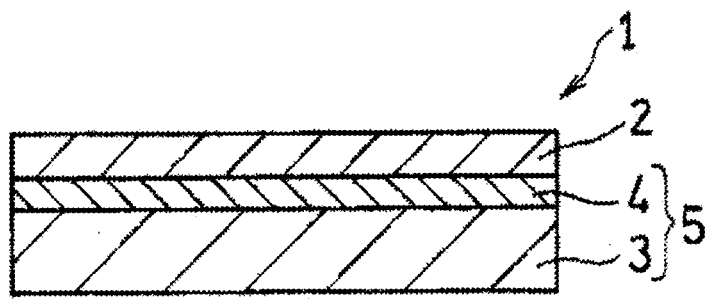
FIG. 3 is a schematic sectional view illustrating a cell structure included in the fuel cell in FIG. 2.

A fuel cell 10 includes a cell structure 1. FIG. 3 illustrates an example of a schematic sectional view of the cell structure 1. As illustrated in FIG. 3, the cell structure 1 includes a cathode 2, an anode 3, and a solid electrolyte layer 4 disposed therebetween. In the example illustrated in the figure, the anode 3 and the solid electrolyte layer 4 are combined to form an electrolyte layer-electrode assembly 5.

As illustrated in FIG. 2, the fuel cell 10 includes, in addition to the cell structure 1, an oxidant channel 23 through which an oxidant is supplied to the cathode 2, a fuel channel 53 through which a fuel is supplied to the anode 3, a cathode-side separator 22, and an anode-side separator 52. In the example illustrated in FIG. 2, the oxidant channel 23 is formed by the cathode-side separator 22, and the fuel channel 53 is formed by the anode-side separator 52. The cell structure 1 is sandwiched between the cathode-side separator 22 and the anode-side separator 52. The oxidant channel 23 of the cathode-side separator 22 is disposed so as to face the cathode 2 of the cell structure 1, and the fuel channel 53 of the anode-side separator 52 is disposed so as to face of the anode 3.

Each of the components constituting the fuel cell will be further described below.

(Solid Electrolyte Layer)

A solid electrolyte that exhibits proton conductivity or oxygen ion conductivity in an intermediate temperature range of 400° C. or higher and 600° C. or lower is used as the solid electrolyte layer. For example, a perovskite oxide such as $BaCe_{0.8}Y_{0.2}O_{2.9}$ (BCY) or $BaZr_{0.8}Y_{0.2}O_{2.9}$ (BZY) exhibits high proton conductivity in the intermediate temperature range and thus can be used as a solid electrolyte of an intermediate temperature fuel cell. These solid electrolytes can be formed by, for example, sintering.

The thickness of the solid electrolyte layer is, for example, 1 μm or more and 50 μm or less, and preferably 3 μm or more and 20 μm or less. A thickness of the solid electrolyte layer within such a range is preferred because the resistance of the solid electrolyte layer is suppressed to be low.

The solid electrolyte layer forms a cell structure together with a cathode and an anode and can be incorporated in a fuel cell. In the cell structure, the solid electrolyte layer is sandwiched between the cathode and the anode, one main surface of the solid electrolyte layer is in contact with the anode, and the other main surface is in contact with the cathode.

(Cathode)

The cathode has a porous structure. When a proton conductive solid electrolyte layer is used, at the cathode, a reaction between protons conducted through the solid electrolyte layer and oxide ions (reduction reaction of oxygen) proceeds. The oxide ions are produced by the dissociation of an oxidant (oxygen) introduced through the oxidant channel.

As the material of the cathode, publicly known materials can be used. The material of the cathode is preferably, for example, compounds containing lanthanum and having a perovskite structure (such as ferrite, manganite, and/or cobaltite). Of these compounds, compounds further containing strontium are more preferred. Specific examples thereof include lanthanum strontium cobalt ferrite (LSCF, $La_{1-x1}Sr_{x1}Fe_{1-y1}Co_{y1}O_{3-\delta1}$ where $0<x1<1$, $0<y1<1$, and $\delta1$ represents an oxygen vacancy concentration), lanthanum strontium manganite (LSM, $La_{1-x2}Sr_{x2}MnO_{3-\delta1}$ where $0<x2<1$ and $\delta1$ represents an oxygen vacancy concentration), and lanthanum strontium cobaltite (LSC, $La_{1-x3}Sr_{x3}CoO_{3-\delta1}$ where $0<x3\leq1$ and $\delta1$ represents an oxygen vacancy concentration). From the viewpoint of promoting the reaction between protons and oxide ions, the cathode may include a catalyst such as Pt. When the catalyst is included, the cathode can be formed by mixing the catalyst with the above material and sintering the mixture.

The cathode can be formed by, for example, sintering a raw material of the above material.
For example, a binder, an additive, and/or a dispersion medium may be used together with the raw material, as needed.

The thickness of the cathode is not particularly limited, but can be appropriately determined from, for example, 5 μm or more and 2 mm or less, and may be about 5 μm or more and about 40 μm or less.

(Anode)

The anode has a porous structure. At the anode, a reaction of oxidizing a fuel, such as hydrogen, introduced through the fuel channel and releasing protons and electrons (oxidation reaction of fuel) proceeds.

As the material of the anode, publicly known materials can be used. Examples of the material of the anode include composite oxides of nickel oxide (NiO) serving as a catalyst component and a proton conductor (such as yttrium oxide ($Y_2O_3$), BCY, or BZY).

The anode can be formed by, for example, sintering raw materials. For example, the anode can be formed by sintering a mixture of a NiO powder and a powder of a proton conductor or the like.

The thickness of the anode can be appropriately determined from, for example, 10 μm or more and 2 mm or less and may be 10 μm or more and 100 μm or less.

In FIGS. 2 and 3, the thickness of the anode 3 is larger than that of the cathode 2, and the anode 3 functions as a support that supports the solid electrolyte layer 4 (by extension, the cell structure 1).
The thickness of the anode 3 need not necessarily be larger than that of the cathode 2. For example, the thickness of the anode 3 may be substantially the same as the thickness of the cathode 2.

In the example illustrated in the figures, an example in which the anode and the solid electrolyte layer are combined has been described however, the structure is not limited to this case. Alternatively, the cathode and the solid electrolyte layer may be combined to form an electrolyte layer-electrode assembly.

The oxidant channel 23 has an oxidant inlet into which the oxidant flows and an oxidant outlet through which, for example, water produced by the reaction and an unused oxidant are discharged (both not illustrated). An example of the oxidant is a gas containing oxygen. The fuel channel 53 has a fuel-gas inlet into which a fuel gas flows and a fuel-gas outlet through which, for example, an unused fuel and $H_2O$, $N_2$, and $CO_2$ formed by the reaction are discharged (both not illustrated). Examples of the fuel gas include gases containing a gas of hydrogen, methane, ammonia, carbon monoxide, or the like.

The fuel cell 10 may include a cathode-side current collector 21 disposed between the cathode 2 and the cathode-side separator 22 and an anode-side current collector 51 disposed between the anode 3 and the anode-side separator 52. The cathode-side current collector 21 has a function of collecting a current and a function of diffusively supplying an oxidant introduced through the oxidant channel 23 to the cathode 2. The anode-side current collector 51 has a function of collecting a current and a function of diffusively supplying a fuel gas introduced through the fuel channel 53 to the anode 3. Therefore, the current collectors are each preferably a structure having sufficient air-permeability. In the fuel cell 10, the current collectors 21 and 51 need not necessarily be provided.

Since the fuel cell 10 includes a proton conductive solid electrolyte, the fuel cell 10 can be operated at lower than 700° C., and preferably in an intermediate temperature range of about 400° C. or higher and about 600° C. or lower.

(Separator)

In the case where a plurality of cell structures are stacked to form a fuel cell, for example, the cell structure 1, the cathode-side separator 22, and the anode-side separator 52 are stacked as a unit. The plurality of cell structures 1 may be connected together in series with, for example, a separator that includes gas channels (an oxidant channel and a fuel channel) in both surfaces thereof.

As the materials of the separators, heat-resistant alloys such as stainless steels, nickel-based alloys, and chromium-based alloys can be exemplified in terms of proton conductivity and heat resistance. Of these, stainless steels are preferred in view of their low cost. The operating temperatures of protonic ceramic fuel cells (PCFCs) are about 400° C. or higher and about 600° C. or lower, and thus stainless steels can be used as the materials of the separators.

(Current Collector)

Examples of the structure used as each of the cathode-side current collector and the anode-side current collector include porous metal bodies, metal meshes, perforated metals, and expanded metals that contain, for example, silver, silver alloys, nickel, and nickel alloys. Of these, porous metal bodies are preferred in terms of lightweight properties and air-permeability. In particular, porous metal bodies having a three-dimensional mesh-like structure are preferred. The three-dimensional mesh-like structure refers to a structure in which rod-like or fibrous metals constituting a porous metal body are three-dimensionally connected together to form a network. Examples thereof include sponge-like structures and nonwoven fabric-like structures.

The porous metal body can be formed by, for example, coating a resin porous body having continuous pores with the metal described above. After the metal coating treatment, the inner resin is removed. As a result, a hollow space is formed inside the skeleton of the porous metal body, and the skeleton becomes hollow. For example, "Celmet" formed of nickel and manufactured by Sumitomo Electric Industries, Ltd. can be used as a commercially available porous metal body having the above structure.

The fuel cell can be manufactured by a publicly known method except that the cell structure described above is used.

EXAMPLES

Hereafter, the present disclosure will be specifically described on the basis of Examples and Reference Examples; however, the present disclosure is not limited to the Examples below Reference Example 11

(1) Preparation of Ni Catalyst-Supported $LaNbO_4$

A $La_2O_3$ powder and a $Nb_2O_5$ powder were mixed in a ball mill and disintegrated. Subsequently, the disintegrated product was calcined at 800° C. for 10 hours in an air atmosphere and then disintegrated again. Subsequently, the disintegrated product was heat-treated at 1,200° C. for 10 hours to synthesize $LaNbO_4$.

The LaNbO$_4$ prepared as described above was immersed in an aqueous nickel(II) nitrate solution, and water was then removed by the evaporation drying method. At this time, the Ni concentration in the aqueous nickel nitrate solution was adjusted such that the Ni content after removal of water became 3% by mass based on the total mass of LaNbO$_4$ and Ni. The resulting product was screened with a sieve having 30 meshes per 1 inch and heat-treated in an atmosphere containing hydrogen at 600° C. for one hour to prepare a steam reforming catalyst a1.

(2) Evaluation

The steam reforming catalyst a1 (0.1 g) was placed between quartz wool wads and fixed in a reaction tube. Next, the reaction tube in which the steam reforming catalyst a1 was placed was heated to 550° C.

A mixed gas of $C_3H_8:O_2:H_2O:N_2$ was introduced into the reaction tube such that the flow rates became 6.82 cc/min: 1.19 cc/min:65.1 cc/min:59.5 cc/min, respectively.

The gas composition after the reaction was analyzed by gas chromatography (apparatus name: Agilent 7890) in which a TCD and an FID were used in combination. The masses of $C_3H_8$, $H_2O$, $H_2$, $CH_4$, $CO_2$, and CO contained in the gas after the reaction (reformed gas) were determined, and the sum of the masses was calculated. The sum of the masses was subtracted from the total mass of $C_3H_8$, $H_2O$, and $O_2$ contained in the gas before the reaction (supply gas). The mass remaining after the subtraction was determined as an amount of C (carbon) produced after the reaction.

Figure 4:
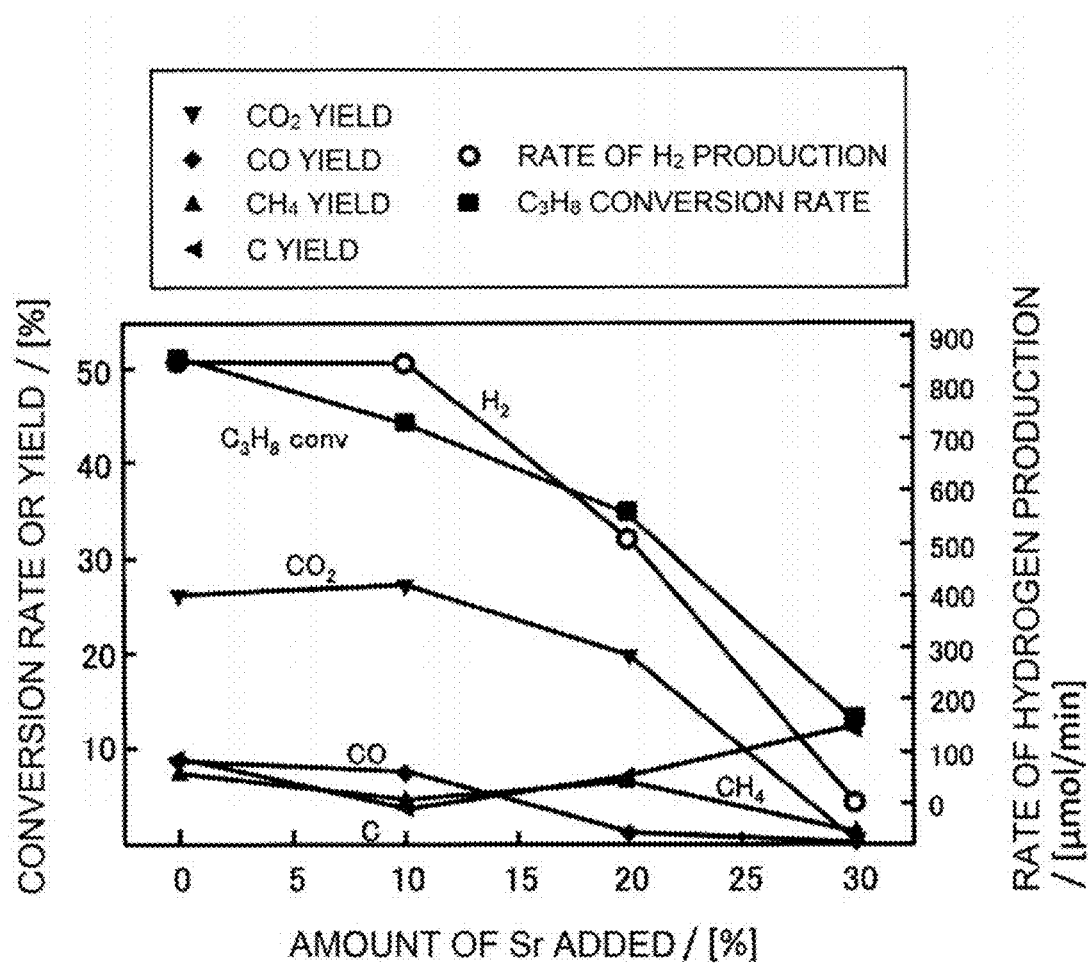
FIG. 4 is a graph showing an autothermal steam reforming performance of catalysts in which Ni is supported on a $La_{1-x}Sr_xNbO_4$ ($0\leq x\leq 0.3$) carrier.

The $C_3H_8$ conversion rate (%), the rate of $H_2$ production (μmol/min), and the selectivity and yield (%) of $CH_4$, $CO_2$, CO, and C were determined and evaluated. FIG. 4 shows the evaluation results of the conversion rate and the yield. The steam reforming catalyst a1 corresponds to the catalyst in which the amount of Sr added is 0% in FIG. 4. The amount of Sr added means a percentage % of the number of atoms of St Sr that replaces La in a $La_{1-x}Sr_xNbO_4$ carrier and refers to a numerical value obtained by multiplying x by 100.

Reference Example 2

Some La of LaNbO$_4$ in Reference Example 1 was replaced with Sr to synthesize $La_{1-x}Sr_xNbO_4$, and the $La_{1-x}Sr_xNbO_4$ was used as a carrier of a Ni catalyst. The $La_{1-x}Sr_xNbO_4$ was synthesized by the same method as in Reference Example 1 except that a $La_2O_3$ powder, a $Nb_2O_5$ powder, and a SrO powder were mixed in a ball mill and a disintegrated product obtained by disintegration was calcined.

A plurality of $La_{1-x}Sr_xNbO_4$ carriers having different amounts of Sr added were prepared, and Ni was supported on each of the carriers by the same method as in Reference Example 1 to prepare steam reforming catalysts a2 to a4. The steam reforming catalyst a2 (x=0.1), the steam reforming catalyst a3 (x=0.2), and the steam reforming catalyst a4 (x=0.3) were evaluated as in Reference Example 1. FIG. 4 shows the evaluation results, in FIG. 4, x=0.1 indicates that the amount of Sr added is 10%, x=0.2 indicates that the amount of Sr added is 20%, and x=0.3 indicates that the amount of Sr added is 30%.

As shown in FIG. 4, the $C_3H_8$ conversion rate tends to decrease with the addition of Sr. However, in the steam reforming catalyst a2 to which Sr was added in an amount of 10%, the yield of C (carbon) significantly decreased. On the other hand, in the steam reforming catalyst a2, although the $C_3H_8$ conversion rate is lower than that of the steam reforming catalyst a1, the steam reforming catalyst a2 maintains a high rate of $H_2$ production that is substantially equal to that of the steam reforming catalyst a1 to which Sr is not added. This means that, in the steam reforming catalyst a2, $H_2$ is preferentially produced compared with the steam reforming catalyst a1.

Thus, the addition of Sr to a LaNbO$_4$ carrier enables $H_2$ to be preferentially produced and enables the amount of C (carbon) produced to be reduced, in particular, near a range where the amount of Sr added is 10% (x=0.1). Referring to FIG. 4, presumably, the effect of preferentially producing 142 and the effect of reducing the amount of C produced can be similarly achieved when the amount of Sr added is 8% or more and 12% or less (0,08×0.12).

Furthermore, examinations were performed to determine whether, by incorporating a second metal besides Ni as catalyst metals in a $La_{0.9}Sr_{0.1}NbO_4$ carrier, an improvement of the catalytic activity can be expected, specifically, the $C_3H_8$ conversion rate that is decreased by the addition of Sr can be recovered while maintaining the effect of reducing the amount of C (carbon) produced. The results of the examinations are described below.

Example 3

A $La_{0.9}Sr_{0.1}NbO_4$ carrier was synthesized as in the steam reforming catalyst a2 of Reference Example 2, and steam reforming catalysts containing Ni and a second metal (Co, Ru, Cu, Fe, Pd, or Pt) as catalyst metals were prepared. Of these, Co and Ru are Examples. and Cu, Fe, Pd, and Pt are Reference Examples.

The second metal was supported on the $La_{0.9}Sr_{0.1}NbO_4$ carrier by the evaporation drying method as in Ni. As a Ni compound, nickel(11) nitrate hexahydrate was used. As a compound of the second metal, with regard to Co, Ru, Cu, Fe, and Pd, a nitrate or a hydrate of a nitrate was used. With regard to Pt, chloroplatinic acid (hexachloroplatinic(1V) acid hexahydrate) was used.

The Ni compound and the compound of the second metal were dissolved in water in a predetermined blending ratio, and $La_{0.9}Sr_{0.1}NbO_4$ was immersed in the aqueous solution of the Ni compound and the second metal. Subsequently, the aqueous solution in a glass container was heated at 85° C. while being stirred with a stirrer to thereby evaporate water. At this time, the concentrations of the Ni compound and the second metal compound contained in the aqueous solution were adjusted such that the total content of Ni. and the second metal after removal of water became 3% by mass based on the total mass of $La_{0.9}Sr_{0.1}NbO_4$, Ni, and the second metal. The blending ratio of the Ni compound and the compound of the second metal was adjusted such that the ratio of the second metal to the total of Ni and the second metal contained in the compounds became 10% by mass. Accordingly, the proportion of the second metal with respect to the whole of the steam reforming catalyst after removal of water becomes 0.3% by mass.

The resulting products were each screened with a sieve having 30 meshes per 1 inch and heat-treated in an atmosphere containing hydrogen at 600° C. for one hour to prepare a steam reforming catalyst b1 containing Co as the second metal, a steam reforming catalyst c1 containing Ru as the second metal, a steam reforming catalyst d1 containing Cu as the second metal, a steam reforming catalyst e1 containing Fe as the second metal, a steam reforming catalyst f1 containing Pd as the second metal, and a steam reforming catalyst a1 containing Pt as the second metal.

The $C_3H_8$ conversion rate (%), the rate of 1:12 production (μmol/min), and the selectivity (%) of $CH_4$, $CO_2$, CO, and C of each of the steam reforming catalysts b1, c1, d1, e1, f1, and g1 were determined by the same method as in Reference Example 1. Table 1 shows the evaluation results.

Example 4

Catalyst metals containing Ni and Co were supported on a $La_{0.9}Sr_{0.1}NbO_4$ carrier as in the steam reforming catalyst b1 of Example 3. At this time, the blending ratio of Ni and Co was changed while the total mass of Ni and Co relative to the total mass of $La_{0.9}Sr_{0.1}NbO_4$. Ni, and Co was constant (3% by mass).

Steam reforming catalysts in which the amount of Co blended (supported amount) relative to the total mass of Ni and Co serving as catalyst metals and the carrier $La_{0.9}Sr_{0.1}NbO_4$ was 0.15% by mass and 0.5% by mass were prepared and used as steam reforming catalysts b2 and b3, respectively.

The $C_3H_8$ conversion rate (%), the rate of $H_2$ production (µmol/min), and the selectivity (%) of $CH_4$, $CO_2$, CO, and C of each of the steam reforming catalysts b2 and b3 were determined by the same method as in Example 1. Table 2 shows the evaluation results. Table 2 also shows the results (that are the same as those in Table 1) of the catalyst a2 in which Co is not supported and the catalyst b1 in which Co is supported in an amount of 0.3% by mass.

described above. It was found that, in the steam reforming catalyst c1, the amount of C (carbon) produced was within the range of measurement error, and C (carbon) was hardly produced, Although the steam reforming catalyst e1 is inferior to the steam reforming catalyst b1 in terms of the $C_3H_8$ conversion rate, the steam reforming catalyst c1 is superior to the steam reforming catalyst b1 in that the production of C (carbon) hardly occurs.

Referring to Table 2, when the amount of Co supported was 0.15% by mass or more and 0.5% by mass or less, a $C_3H_8$ conversion rate higher than that of the steam reforming catalyst a2 was obtained. In addition, the amount of C (carbon) produced is also reduced compared with that of the steam reforming catalyst a2. In particular, the steam reforming catalyst b1 in which the amount of Co supported is 0.3% by mass is good in terms of the $C_3H_8$ conversion rate. On the other hand, in the steam reforming catalysts b2 and b3 in which the amount of Co supported is 0.15% by mass and 0.5% by mass, respectively, the amount of C (carbon) produced is significantly reduced.

In Tables 1 and 2, the numerical values in the parentheses in the selectivity of $CH_4$, $CO_2$, CO, and C each indicate an amount (%) of change in the selectivity from that of the steam reforming catalyst a2 and represent how much the

TABLE 1

| | Catalyst | $C_3H_8$ conversion rate/[%] | Rate of $H_2$ production/ [µmol/min] | Selectivity/[%] | | | |
|---|---|---|---|---|---|---|---|
| | | | | $CH_4$ | $CO_2$ | CO | C |
| a2 | Ni/$La_{0.9}Sr_{0.1}NbO_4$ | 43.8 | 841.2 | 11.0 | 62.1 | 17.1 | 9.8 |
| b1 | Ni—Co/$La_{0.9}Sr_{0.1}NbO_4$ | 58.7 | 868.6 | 25.6 (+14.6) | 54.0 (−8.1) | 13.6 (−3.5) | 7.0 (−2.8) |
| c1 | Ni—Ru/$La_{0.9}Sr_{0.1}NbO_4$ | 50.2 | 776.6 | 20.5 (+9.5) | 60.8 (−1.3) | 13.5 (−3.6) | −0.6 (−10.2) |
| d1 | Ni—Cu/$La_{0.9}Sr_{0.1}NbO_4$ | 42.5 | 552.4 | 19.5 (+8.5) | 44.5 (−17.6) | 12.0 (−5.1) | 24.0 (+13.2) |
| e1 | Ni—Fe/$La_{0.9}Sr_{0.1}NbO_4$ | 15.6 | 3.6 | 6.4 (−3.8) | 10.3 (−51.8) | 0.0 (−17.1) | 83.3 (+73.5) |
| f1 | Ni—Pd/$La_{0.9}Sr_{0.1}NbO_4$ | 28.2 | 252.2 | 4.3 (−6.7) | 40.4 (−21.7) | 3.2 (−13.9) | 52.1 (+42.3) |
| g1 | Ni—Pt/$La_{0.9}Sr_{0.1}NbO_4$ | 44.5 | 645.6 | 19.1 (+8.1) | 51.7 (−10.4) | 4.7 (−12.4) | 24.7 (+14.9) |

TABLE 2

| | Ni/$La_{0.9}Sr_{0.1}NbO_4$ Amount of Co supported/ [mass %] | $C_3H_8$ conversion rate/[%] | Rate of $H_2$ production/ [µmol/min] | Selectivity/[%] | | | |
|---|---|---|---|---|---|---|---|
| | | | | $CH_4$ | $CO_2$ | CO | C |
| a2 | 0 | 43.8 | 841.2 | 11.0 | 62.1 | 17.1 | 9.8 |
| b2 | 0.15 | 44.6 | 816.7 | 19.0 (+8.0) | 62.2 (+0.1) | 16.4 (−0.7) | 1.6 (−8.2) |
| b1 | 0.3 | 58.7 | 868.6 | 25.6 (+14.6) | 54.0 (−8.1) | 13.6 (−3.5) | 7.0 (−2.8) |
| b3 | 0.5 | 52.9 | 814.5 | 24.2 (+14.2) | 59.5 (−2.6) | 15.6 (−1.5) | 0.7 (−9.1) |

As shown in Table 1, the steam reforming catalyst b1 containing Ni and Co as catalyst metals and the steam reforming catalyst c1 containing Ni and Ru as catalyst metals exhibited $C_3H_8$ conversion rates that were higher than the $C_3H_8$ conversion rate of the steam reforming catalyst a2 containing Ni alone as a catalyst metal. In addition, the production of C (carbon) is also suppressed.

In the steam reforming catalyst c1, the selectivity of C (carbon) is a negative value. This is because the amount of C (carbon) produced is determined by a subtraction on the basis of the results of analysis by gas chromatography, as selectivity is changed by changing a catalyst metal in the case where the carrier is the same. Although Tables 1 and 2 show the results obtained when the carrier is formed of $La_{0.9}Sr_{0.1}NbO_4$, presumably, the change in the selectivity due to the change in the catalyst metal does not depend on the amount x of Sr added but is substantially the same as the change shown in the parentheses of Tables 1 and 2 as long as the amount x of Sr added is not significantly changed from x=0.1. namely, at least in a range of $0 \le x \le 0.2$.

Referring to FIG. 4, regarding the steam reforming catalyst a1 in which $LaNbO_4$ containing no Sr is used as a carrier, the amount of C (carbon) produced is larger than that in the steam reforming catalyst a2. However, the results in Tables 1 and 2 show that, even in the case where $LaNbO_4$ is used as a carrier, the yield of C (carbon) can be reduced by using Co or Ru as the second metal.

The steam reforming catalyst a1 in which $LaNbO_4$ containing no Sr is used as a carrier has a better $C_3H_8$ conversion rate than that of the steam reforming catalyst a2. Accordingly, a steam reforming catalyst in which Ni and at least one of Ru and Co are supported as catalyst metals on a $LaNbO_4$ carrier enables the amount of C (carbon) produced to be significantly reduced while maintaining a high $C_3H_8$ conversion rate. Referring to Table 2, in the case where Co is supported on a $LaNbO_4$ carrier, the amount of Co supported is preferably within a range of a value close to 0.15% by mass (for example, 0,1% by mass or more and 0,2% by mass or less) or a range of a value close to 0.5% by mass (for example, in a range of 0.45% by mass or more and 0.55% by mass or less) from the viewpoint of reducing the amount of C (carbon) produced.

In the case where the carrier is formed of $La_{1-x}Sr_xNbO_4$ to which Sr is added, as long as x is within a range of $0<x\leq0.12$, the amount of C (carbon) produced can be significantly reduced by using Ni and at least one of Ru and Co as catalyst metals while a high $C_3H_8$ conversion rate is maintained.

REFERENCE SIGNS LIST

1: cell structure
2: cathode
3: anode
4: solid electrolyte layer
5: electrolyte layer-electrode assembly
10: fuel cell
21: cathode-side current collector
22: cathode-side separator
23: oxidant channel
51: anode-side current collector
52: anode-side separator
53: fuel channel
60: fuel cell system
61: steam reformer
62: gas containing hydrocarbon and steam
63: reformed gas (fuel gas)
64: air (oxidant)
65: exhaust gas

The invention claimed is:

1. A steam reforming catalyst that promotes production of hydrogen from a gas containing a hydrocarbon in the presence of steam, the steam reforming catalyst comprising:
a carrier; and
two or more catalyst metals supported on the carrier and including a first metal and a second metal,
wherein the first metal includes Ni,
the second metal includes at least one of Co and Ru, and
the carrier is represented by $La_{1-x}Sr_xNbO_4$ where x is in a range of $0<x\leq0.12$.

2. The steam reforming catalyst according to claim 1, wherein the carrier is formed of $La_{1-x}Sr_xNbO_4$ where x is in a range of $0.08\leq x\leq0.12$.

3. The steam reforming catalyst according to claim 1, wherein the second metal includes at least Co.

4. The steam reforming catalyst according to claim 1,
wherein a content of the catalyst metals is 1% by mass or more and 5% by mass or less based on a total of the catalyst metals and the carrier, and
a content of the second metal is 0.15% by mass or more and 0.5% by mass or less based on the total of the catalyst metals and the carrier.

5. The steam reforming catalyst according to claim 1, wherein the carrier is supported on a porous body.

6. The steam reforming catalyst according to claim 5, wherein the porous body has a honeycomb structure.

7. The steam reforming catalyst according to claim 1, wherein the hydrocarbon includes propane.

8. The steam reforming catalyst according to claim 1, wherein the gas containing a hydrocarbon is a mixed gas containing the hydrocarbon and oxygen.

9. A fuel cell system comprising:
a fuel cell that includes
a cell structure including a cathode, an anode, and a solid electrolyte layer disposed between the cathode and the anode,
a cathode-side separator disposed on a cathode side with respect to the solid electrolyte layer,
an anode-side separator disposed on an anode side with respect to the solid electrolyte layer,
an oxidant channel which is formed between the cathode-side separator and the cathode and through which an oxidant is supplied to the cathode, and
a fuel channel which is formed between the anode-side separator and the anode and through which a fuel is supplied to the anode; and
a steam reformer that includes the steam reforming catalyst according to claim 1.

10. The fuel cell system according to claim 9, wherein an operating temperature of the fuel cell and a reaction temperature of the steam reformer are each 400° C. or higher and 600° C. or lower.

11. The fuel cell system according to claim 9, wherein the steam reformer has a cylindrical shape.

12. The fuel cell system according to claim 11, wherein the steam reformer includes two concentric treatment chambers.

13. The fuel cell system according to claim 12, wherein the two concentric treatment chambers are separated by a porous body.

14. The fuel cell system according to claim 13, wherein the porous body has a honeycomb shape.

* * * * *